Figure 1:
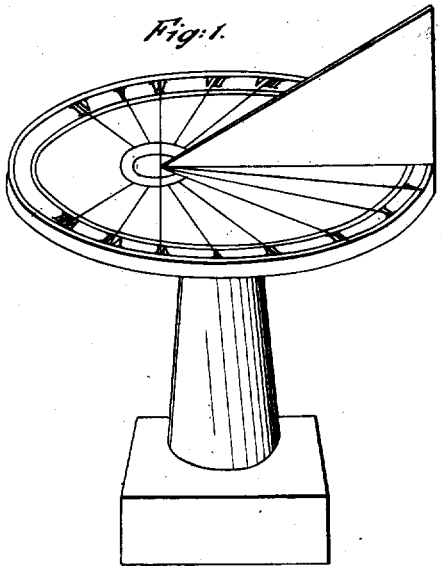
Figure 2:
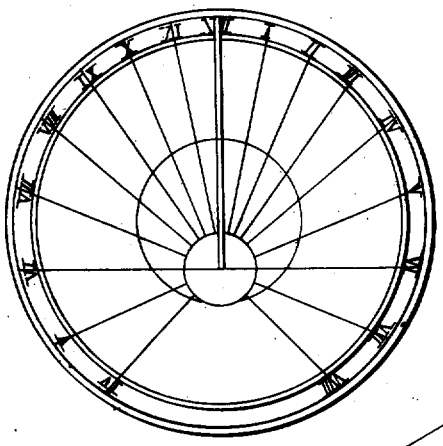
Figure 3:
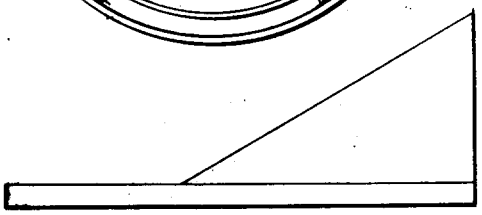

8411X

H. McCLURE.

CAST IRON SUN DIAL.

Patented Sept. 17, 1834.

THE NORRIS PETERS CO., PHOTO-LITHO., WASHINGTON, D. C.

8411X Herman McCluer Hamburgh. N.Y.

Letters Patent.

The Schedule referred to in these Letters Patent and making part of the same, containing a description in the words of the said Herman McCluer himself of his improvement in making Sun Dials, called the Cast Iron Sun Dial.

To all persons to whom these presents shall come, Herman McCluer of Hamburgh in the County of Erie State of New York, sends greeting. Be it known that I the said Hiram McCluer have invented, constructed made and applied to use, a new and useful improvement in making Sun Dials, called the Cast Iron Sun Dial. Specified in the words following. The Dial is of the common form with the improvement of being made of Cast iron and of a large size sufficient for regulating Clocks and Watches. which improvement is all that I claim as my invention; (Now there are many kinds of Sun Dials, such as erect or perpendicular plates facing North or South or East or West. but the horizontal plated Dials are most in use and considered preferable to any other, they are generally made with a round horizontal plate, with a flat Gnomon or stile standing perpendicular, and due North from the centre of the plate, or near there) with the upper edge of said stile, pointing directly at the North pole. a pole star, with hour lines drawn on the horizontal plate to agree with the shadow of the stile at the hours designated)

In testimony that the above is a true Specification of my said improvement as above described. I have hereunto set my hand this twenty first day of July 1834. Ex[illegible]

Witnesses
H. C. McCluer
Daniel Lawrence

Herman McCluer